(12) United States Patent
Schäfer

(10) Patent No.: US 7,040,608 B2
(45) Date of Patent: May 9, 2006

(54) BEARING FOR WHEEL SUSPENSIONS IN A MOTOR VEHICLE

(75) Inventor: Christof Schäfer, Sinzig (DE)

(73) Assignee: ZF Boge Elastmetall GmbH, Damme (DE)

( * ) Notice: Subject to any disclaimer, the term of this patent is extended or adjusted under 35 U.S.C. 154(b) by 0 days.

(21) Appl. No.: 10/761,051

(22) Filed: Jan. 20, 2004

(65) Prior Publication Data

US 2004/0150147 A1    Aug. 5, 2004

(30) Foreign Application Priority Data

Jan. 21, 2003   (DE) ................................ 103 02 413

(51) Int. Cl.
    *B60G 15/00*   (2006.01)
(52) U.S. Cl. .................. 267/220; 267/294; 280/124.15
(58) Field of Classification Search ............ 267/141.1, 267/141, 153, 33, 141.2, 141.3, 141.4, 141.5, 267/141.7, 219, 220, 292, 293, 294; 280/124.155
See application file for complete search history.

(56) References Cited

U.S. PATENT DOCUMENTS

| | | | | |
|---|---|---|---|---|
| 4,434,977 A | * | 3/1984 | Chiba et al. | 267/33 |
| 4,618,127 A | * | 10/1986 | Le Salver et al. | 267/220 |
| 4,877,262 A | * | 10/1989 | Tanahashi et al. | 280/124.155 |
| 5,131,638 A | * | 7/1992 | Hein et al. | 267/220 |
| 6,588,820 B1 | * | 7/2003 | Rice | 296/35.1 |
| 6,592,112 B1 | * | 7/2003 | Bishop et al. | 267/220 |

FOREIGN PATENT DOCUMENTS

| | | |
|---|---|---|
| DE | 30 32 199 C1 | 6/1982 |
| EP | 0 816 140 B1 | 1/1998 |

\* cited by examiner

*Primary Examiner*—Thomas Williams
(74) *Attorney, Agent, or Firm*—McGlew & Tuttle, P.C.

(57) ABSTRACT

A bearing for wheel suspensions in a motor vehicle includes a metallic housing with a pot-shaped vertical section, a rubber buffer arranged in the housing, and an inner part. The inner part can be connected to a piston-and-cylinder unit and is fixed in the rubber buffer. A reinforcing part, which is supported axially and/or radially at the inner wall of the housing, is arranged in the rubber buffer.

19 Claims, 2 Drawing Sheets

BEARING FOR WHEEL SUSPENSIONS IN A MOTOR VEHICLE

REFERENCE TO RELATED APPLICATION

This application claims foreign priority benefits under Title 35, United States Code § 119 of German application DE 103 02.413.1, the content of DE 103 02.413.1 is hereby incorporated by reference.

FIELD OF THE INVENTION

The present invention pertains to a bearing for wheel suspensions in a motor vehicle, comprising a metallic housing with a pot-shaped vertical section, a rubber buffer arranged in the said housing, and a carrier piece, which can be connected to a piston-and-cylinder unit and is fixed in the rubber buffer.

BACKGROUND OF THE INVENTION

Shock-absorbing strut bearings have already been known (e.g., DE 30 32 199 C1, EP 0 816 140 B1), in which a rubber buffer is arranged in a pot-shaped, metallic housing, wherein the shock absorber is fixed with a carrier piece arranged in the rubber buffer. The drawback of these is that the rubber buffer is pretensioned between two flat surfaces, so that this pretensioning acts directly on the rubber spring and the rubber spring is compressed in the process. The possible path of deformation of the rubber buffer is reduced by the compression of the rubber spring, so that the insulation potential for the vibration absorber decreases.

SUMMARY OF THE INVENTION

Based on this, the object of the present invention is to provide a bearing in which a rubber buffer is arranged in a pot-shaped metallic housing in such a way that when the bearing is fastened to the body, the rubber buffer is not pretensioned in such a way that a negative effect will occur on the insulation and the absorbing properties of the piston-and-cylinder unit.

Piston-and-cylinder units are defined, for example, as vibration absorbers, shock-absorbing struts or self-pumping shock-absorbing structures with level control.

To accomplish this object, provisions are made according to the present invention for a reinforcing part, which is supported axially and/or radially at the inner wall of the housing, to be arranged in the rubber buffer. The rubber buffer is divided into a damping buffer and a pretensioning buffer.

Provisions are advantageously made according to an embodiment of the invention for the reinforcing part to be arranged in the housing extending in an annular pattern, but other geometric shapes are conceivable as well.

Provisions are made in another embodiment for the annularly extending reinforcing part to have a decreasing internal diameter starting from the housing.

It is advantageous according to an embodiment or the invention for the pretensioning to be absorbed with an additional rubber layer of the rubber buffer due to the bearing being screwed (connected) to the body of the vehicle, such rubber layer being supported via the metal reinforcement toward the outside on the housing of the bearing. A partial support is also conceivable. The rest of the rubber buffer is not affected, so that the piston-and-cylinder unit with its fastening to the inner part is movable axially and/or radially and/or cardanically and is supported or damped by this part of the rubber buffer in the upward and downward directions.

Provisions are made in another embodiment for the carrier piece received in the rubber buffer to be arranged axially movably. It is advantageous in this connection for the carrier piece to be completely embedded in the rubber buffer, which is decisive for the damping.

Provisions are made in the embodiment of the present invention for the rubber buffer to be dimensioned such that the tensioning buffer protrudes from the pot-shaped housing. It is advantageous in this connection for the protruding part of the tensioning buffer to bring about a pretensioning during the tensioning of the housing in relation to the vehicle body, but this pretensioning is supported at the inner wall of the housing via the reinforcing part and thus it does not affect the lower part of the rubber buffer, which said lower part has the inner part.

Simple fastening of the piston-and-cylinder unit at the bearing is provided by the rubber buffer, the carrier piece and the housing being provided with a through hole for fastening the piston-and-cylinder unit. However, the thread of the piston rod may also be screwed directly into the inner part.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
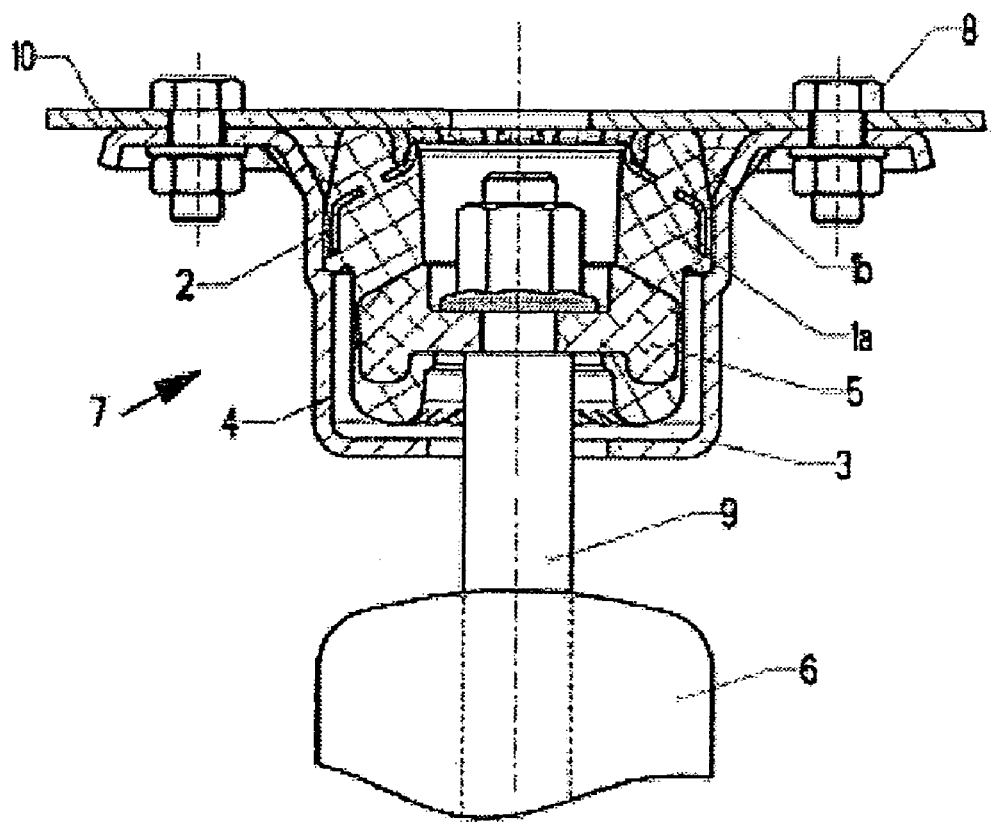
FIG. 1 is a schematic partially sectional view showing a preferred exemplary embodiment according to the present invention.

Referring to the drawings in particular, the bearing 7 shown in FIG. 1 is connected via the screw connections 8 with the vehicle body 10 (e.g. the chassis) of a motor vehicle, while the piston rod 9 of the piston-and-cylinder unit 6 is received and fixed in the bearing 7.

The rubber buffer 1 is first accommodated in the pot-shaped housing 3 of the bearing 7, and the upper area is supported as the tensioning buffer (a tensioning buffer portion) 1b of the rubber buffer 1 at the inner wall 4 of the housing 3 via the reinforcing part 2. The inner part 5 is embedded in the damping buffer (damping buffer portion) 1a of the rubber buffer 1 in the lower part of the rubber buffer 1, and permits the fixation of the piston rod 9 at the inner part 5 due to the corresponding through holes of both the rubber buffer 1, of the inner part 5 and of the housing 3.

Due to the inner part 5 being embedded in the rubber buffer 1, the piston-and-cylinder unit 6 or the piston rod 9 is enabled to allow the inner part 5 to perform axial and/or radial and/or cardanic movements in relation to the rubber buffer 1 by the corresponding adjacent parts of the rubber buffer 1 being compressed and released by the inner part 5.

Due to this type of fastening, the rubber buffer 1 is received in the upper area with a pretensioning between the vehicle body 10 and the housing 3 of the bearing 7, while the piston-and-cylinder unit 6 is not affected by the pretensioning whatsoever, so that a favorable uncoupling or insulation of vibrations can be performed by the rubber buffer 1. Moreover, a harder cardanic characteristic is also produced besides the reduction of the path of deformation and the insulation potential.

Figure 2:
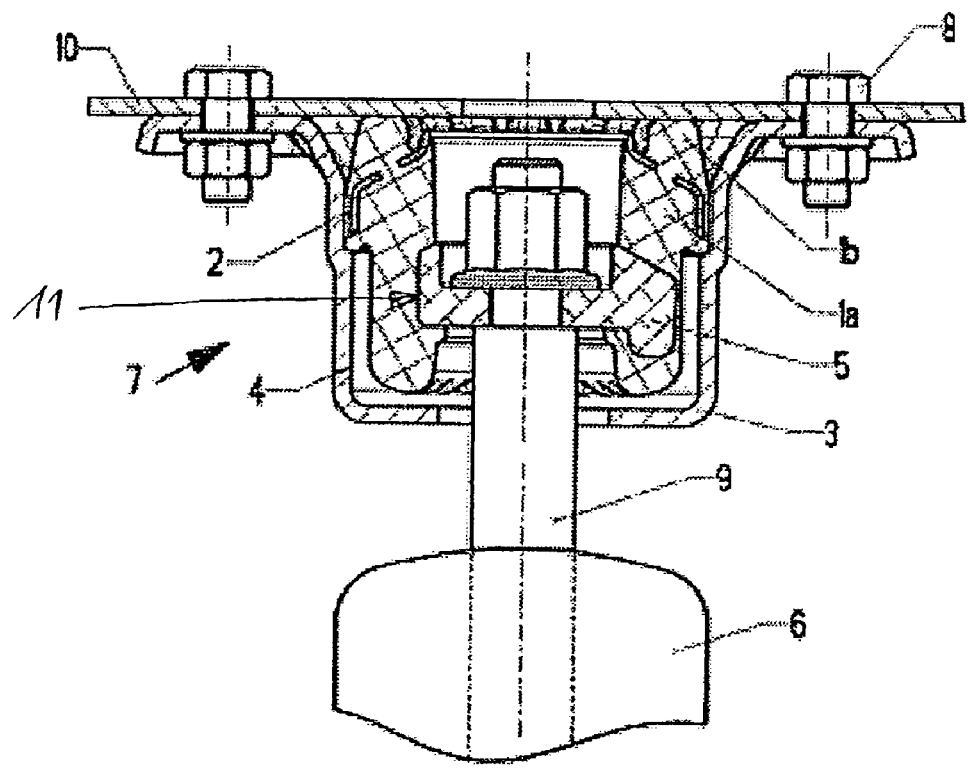
FIG. 2 is a schematic partially sectional view showing another preferred exemplary embodiment according to the present invention.

The bearing 7 shown in FIG. 2 is similar in design to the bearing 7 of FIG. 1. The bearing 7 is connected via the screw connections 8 with the vehicle body 10 (e.g. the chassis) of a motor vehicle, while the piston rod 9 of the piston-and-cylinder unit 6 is received and fixed in the bearing 7.

The rubber buffer 1 is first accommodated in the pot-shaped housing 3 of the bearing 7, and the upper area is supported as the tensioning buffer 1b of the rubber buffer 1 at the inner wall 4 of the housing 3 via the reinforcing part 2. The inner part 5 is embedded in the damping buffer 1a of the rubber buffer 1 in the lower part of the rubber buffer 1, and permits the fixation of the piston rod 9 at the inner part 5 due to the corresponding through holes of both the rubber buffer 1, of the inner part 5 and of the housing 3.

The reinforcing part 2 can be used at the same time to strengthen the body in this area. The tensioning buffer 1b can be inserted as a sealing part between the vehicle body and the housing.

The inner part 11 of the inner part 5 in the left-hand half of the bearing 7 shown in FIG. 2, is not distinctive in the embodiment of FIG. 2 (it is shorter radially at one side as compared with inner part 5 of the embodiment of FIG. 1). With this alternative construction, there is a different cardanic softness.

A damping function and/or an uncoupling function can also be achieved both with the tensioning buffer 1b of the embodiment of FIG. 1 and with the tensioning buffer 1b of the embodiment of FIG. 2.

The lower area of the damping buffer 1a could also be supported at the bottom of the housing 3.

While specific embodiments of the invention have been shown and described in detail to illustrate the application of the principles of the invention, it will be understood that the invention may be embodied otherwise without departing from such principles.

What is claimed is:

1. A motor vehicle bearing and piston-and-cylinder unit comprising:
   piston-and-cylinder unit;
   a metallic housing with a pot-shape said housing having an inner wall;
   a motor vehicle body part connected to said housing;
   a rubber buffer arranged in said housing, said buffer having a first portion and a second portion;
   an inner part connected to said piston-and-cylinder unit and embedded in said rubber buffer; and
   a reinforcing part embedded in said rubber buffer, said first portion of said buffer being supported at said inner wall via said reinforcing part, said housing including an inner shoulder, a diameter of said reinforcing part decreasing with increasing distance from said inner shoulder and with decreasing distance to said body part.

2. A bearing piston-and-cylinder unit in accordance with claim 1, wherein said second portion is a damping buffer portion and said first portion is a tensioning buffer portion.

3. A bearing piston-and-cylinder unit in accordance with claim 1, wherein said reinforcing part is an annularly extending reinforcing part arranged in said housing, extending in an annular pattern.

4. A bearing and piston-and-cylinder unit in accordance with claim 1, wherein said inner part is arranged in one of an axially, radially and cardanically movable manner.

5. A bearing and piston-and-cylinder unit in accordance with claim 3, wherein said, annularly extending reinforcing part has a decreasing internal diameter starting from said housing.

6. A bearing and piston-and-cylinder unit in accordance with claim 2, wherein said rubber buffer is dimensioned such that said tensioning buffer portion protrudes from said pot-shaped housing and is tensioned upon connecting said housing to the vehicle.

7. A bearing piston-and-cylinder unit in accordance with claim 1, wherein for fastening said piston-and-cylinder unit, said rubber buffer, said inner part and said housing are provided with a through hole.

8. A motor vehicle with a bearing and a piston-and-cylinder unit, the vehicle comprising:
   a motor vehicle body part;
   piston-and-cylinder unit;
   a metallic housing with a pot-shape, said metallic housing being connected to said vehicle body part;
   a rubber buffer arranged in said housing;
   an inner part connected to said piston-and-cylinder unit and embedded in said rubber buffer; and
   a reinforcing part supported one of axially and radially at an inner wall of said housing, said reinforcing part being embedded in said rubber buffer, said housing including an inner shoulder, a diameter of said reinforcing part decreasing with increasing distance from said inner shoulder and with decreasing distance to said body part.

9. A motor vehicle in accordance with claim 8, wherein said rubber buffer is divided into a damping buffer portion and a tensioning buffer portion pretensioned relative to one or more of said motor vehicle body part and said housing.

10. A bearing piston-and-cylinder unit in accordance with claim 8, wherein said reinforcing part is an annularly extending reinforcing part arranged in said housing, extending in an annular pattern.

11. A bearing and piston-and-cylinder unit in accordance with claim 10, wherein said, annularly extending reinforcing part has a decreasing internal diameter starting from a housing side toward a motor vehicle part side.

12. A beating and piston-and-cylinder unit in accordance with claim 9, wherein said rubber buffer is dimensioned such that said tensioning buffer portion protrudes from said pot-shaped housing prior to connection with said motor vehicle body part and is tensioned upon connecting said housing to said motor vehicle body part.

13. A bearing and piston-and-cylinder unit in accordance with claim 8, wherein:
said inner part includes first and second sides extending radially from said piston-and cylinder unit, said first side extending radially farther than said second side.

14. A beating and piston-and-cylinder unit in accordance with claim 11, wherein:
said piston-and-cylinder includes a piston rod fixed to said inner part;
said reinforcing part is spaced from said inner part and said piston rod.

15. A bearing arrangement comprising:
a body part;
a housing connected to said body part;
an elastic buffer arranged between said housing and said body part, said elastic buffer having a first portion and a second portion;
a reinforcing part arranged in said elastic buffer;
said body part, said housing, said first portion and said reinforcing part being shaped and arranged to hold said first portion in pretension when said housing is connected to said body part;
a carrier piece embedded in said second portion of said elastic buffer, said carrier piece having a connection for a piston cylinder unit;
said housing, said second portion and said carrier part being shaped and arranged to cause said second portion to damp movement between said carrier piece and said body part, and to have less pretension than said first portion, said housing including an inner shoulder, a diameter of said reinforcing part decreasing with increasing distance from said inner shoulder and with decreasing distance to said body part.

16. An arrangement in accordance with claim 15, wherein:
a piston cylinder unit is connected to said carrier piece;
said body part is a vehicle body part.

17. An arrangement in accordance with claim 15, wherein:
said carrier piece and said reinforcing part are spaced from each other.

18. An arrangement in accordance with claim 15, wherein:
said first portion is more tightly fixed to said housing than said second portion;
said second portion is more movable with respect to said housing than said first portion.

19. An arrangement in accordance with claim 15, wherein:
said second portion is more damping of movement between said carrier piece and body part than said first portion.

* * * * *